(12) United States Patent
Ammar (10) Patent No.: US 11,031,685 B2
(45) Date of Patent: Jun. 8, 2021

(54) AIRCRAFT RADOMES WITH BROADBAND TRANSPARENCY

(71) Applicant: VU SYSTEMS, LLC, Morrisville, NC (US)

(72) Inventor: Dan Ammar, Orlando, FL (US)

(73) Assignee: Vu Systems, LLC, Morrisville, NC (US)

(*) Notice: Subject to any disclaimer, the term of this patent is extended or adjusted under 35 U.S.C. 154(b) by 0 days.

(21) Appl. No.: 16/493,443

(22) PCT Filed: Apr. 23, 2018

(86) PCT No.: PCT/US2018/028818
§ 371 (c)(1),
(2) Date: Sep. 12, 2019

(87) PCT Pub. No.: WO2018/204107
PCT Pub. Date: Nov. 8, 2018

(65) Prior Publication Data
US 2020/0136245 A1    Apr. 30, 2020

Related U.S. Application Data

(60) Provisional application No. 62/500,311, filed on May 2, 2017.

(51) Int. Cl.
*H01Q 1/42* (2006.01)
*B32B 5/02* (2006.01)
(Continued)

(52) U.S. Cl.
CPC ............... *H01Q 1/422* (2013.01); *B32B 5/02* (2013.01); *B32B 5/18* (2013.01); *B32B 5/245* (2013.01);
(Continued)

(58) Field of Classification Search
CPC .......... H01Q 1/42; H01Q 1/421; H01Q 1/422; H01Q 1/281
See application file for complete search history.

(56) References Cited

U.S. PATENT DOCUMENTS 3,039,100 A    6/1962    Kay
3,432,859 A    3/1969    Jordan et al.
(Continued)

FOREIGN PATENT DOCUMENTS

DE    3544092 A1    6/1987
JP    H06283918 A    10/1994

OTHER PUBLICATIONS

International Search Report and Written Opinion of the International Searching Authority, International Application No. PCT/US2018/028818, dated Jul. 3, 2018, 10 pp.
(Continued)

*Primary Examiner* — Hoang V Nguyen
(74) *Attorney, Agent, or Firm* — Myers Bigel, P.A.

(57) ABSTRACT

An aircraft nose radome has a first portion that is transparent to X band microwave energy, and a second portion that is transparent to W band microwave energy. The second portion may be an insert that is secured to the radome at an opening formed therein. The insert may have a multi-layer structure with first, second and third layers, a fourth layer of foam between the first and second layers, and a fifth layer of foam between the second and third layers. The insert may include a plurality of spaced-apart, elongated reinforcing members or ribs between the first and second layers and between the second and third layers that extend along a longitudinal direction defined by the insert. The insert may have a serrated cross-sectional configuration.

31 Claims, 8 Drawing Sheets

(51) Int. Cl.
 B32B 5/18    (2006.01)
 B32B 5/24    (2006.01)
 B64C 1/36    (2006.01)
 G01S 7/03    (2006.01)
 G01S 13/90   (2006.01)
 G01S 7/02    (2006.01)
 H01Q 1/28    (2006.01)

(52) U.S. Cl.
 CPC .................. *B64C 1/36* (2013.01); *G01S 7/03* (2013.01); *H01Q 1/421* (2013.01); *B32B 2260/023* (2013.01); *B32B 2260/046* (2013.01); *B32B 2262/101* (2013.01); *B32B 2266/0278* (2013.01); *B32B 2307/20* (2013.01); *B32B 2605/18* (2013.01); *G01S 13/90* (2013.01); *G01S 2007/027* (2013.01); *H01Q 1/281* (2013.01)

(56) References Cited

U.S. PATENT DOCUMENTS

| | | | |
|---|---|---|---|
| 5,408,244 A | | 4/1995 | Mackenzie |
| 6,028,565 A | * | 2/2000 | Mackenzie ............ H01Q 1/422 |
| | | | 343/872 |
| 6,150,974 A | | 11/2000 | Tasaka et al. |
| 6,661,368 B1 | | 12/2003 | Allen et al. |
| 7,617,022 B1 | * | 11/2009 | Wood .................... G02B 27/01 |
| | | | 340/447 |
| 2012/0038539 A1 | | 2/2012 | Chang |
| 2013/0009846 A1 | | 1/2013 | Freitag et al. |
| 2015/0130671 A1 | | 5/2015 | Cordone |
| 2015/0295306 A1 | * | 10/2015 | Starke ..................... H01Q 1/36 |
| | | | 343/872 |

OTHER PUBLICATIONS

Pei et al., "Electromagnetic Optimal Design for Dual-Band Radome Wall With Alternating Layers of Staggered Composite and Kagome Lattice Structure", Progress in Electromagnetics Research, vol. 122, pp. 437-452, 2012.
"Communication with Supplementary European Search Report", EP Application No. 18795021.7, dated Jan. 11, 2021, 12 pp.
"Examination Report", CA Application No. 3,055,774, dated Jan. 25, 2021, 4 pp.
"IEEE Standard Letter Designations for Radar-Frequency Bands; IEEE Std 521-2019 (Revision of IEEE Std 521-2002)", IEEE Standard, XP068166878, Retrieved from the Internet: URL:https://ieeexplore.ieee.org/documenV8999849, Feb. 14, 2020, 14 pp.
IEEE Standards Board , "IEEE Std 521-1984 IEEE Standard Letter Designations for Radar-Frequency Bands Radar Systems", XP055757073, Retrieved from the Internet: URL:https://ieeexplore.ieee.org/stampPDF/getPDF.jsp?tp=&arnumber=29086&ref=aHR0cHM6Ly93d3cuZ29vZ2xlLmNvbS8=, Mar. 22, 1984, 9 pp.

* cited by examiner

|  |  | TRANSMISSION COEFFICIENT (dB) | | |
| --- | --- | --- | --- | --- |
| FREQUENCY BAND (GHz) | INCIDENT ANGLE (Deg) | PER POLARIZATION | PR POLARIZATION | AVERAGE |
| 80-100 | 45 | -0.7 | -0.46 | -0.58 |
| 80-100 | 50 | -0.75 | -0.46 | -0.60 |
| 83-103 | 55 | -0.9 | -0.46 | -0.68 |

FIG. 11A

|  |  | REFLECTION COEFFICIENT (dB) | | |
| --- | --- | --- | --- | --- |
| FREQUENCY BAND (GHz) | INCIDENT ANGLE (Deg) | PER POLARIZATION | PR POLARIZATION | AVERAGE |
| 80-100 | 45 | -18.5 | -27.2 | -21.80 |
| 80-100 | 50 | -18.3 | -29 | -22.10 |
| 83-103 | 55 | -16.6 | -31.4 | -21.17 |

FIG. 11B

|  |  | TOTAL LOSS (dB) | | |
| --- | --- | --- | --- | --- |
| FREQUENCY BAND (GHz) | INCIDENT ANGLE (Deg) | PER POLARIZATION | PR POLARIZATION | AVERAGE |
| 80-100 | 45 | -0.82 | -0.48 | -0.64 |
| 80-100 | 50 | -0.88 | -0.47 | -0.66 |
| 83-103 | 55 | -1.09 | -0.47 | -0.74 |

FIG. 11C

AIRCRAFT RADOMES WITH BROADBAND TRANSPARENCY

RELATED APPLICATIONS

This application is a 35 U.S.C. § 371 national stage application of PCT Application No. PCT/US2018/028818, filed on Apr. 23, 2018, which itself claims the benefit of and priority to U.S. Provisional Patent Application No. 62/500,311 filed May 2, 2017, the disclosures of which are incorporated herein by reference as if set forth in their entireties. The above-referenced PCT International Application was published in the English language as International Publication No. WO2018/204107 A1 on Nov. 8, 2018.

FIELD OF THE INVENTION

The present invention relates generally to aircraft and, more particularly, to aircraft radomes.

BACKGROUND OF THE INVENTION

Figure 1:
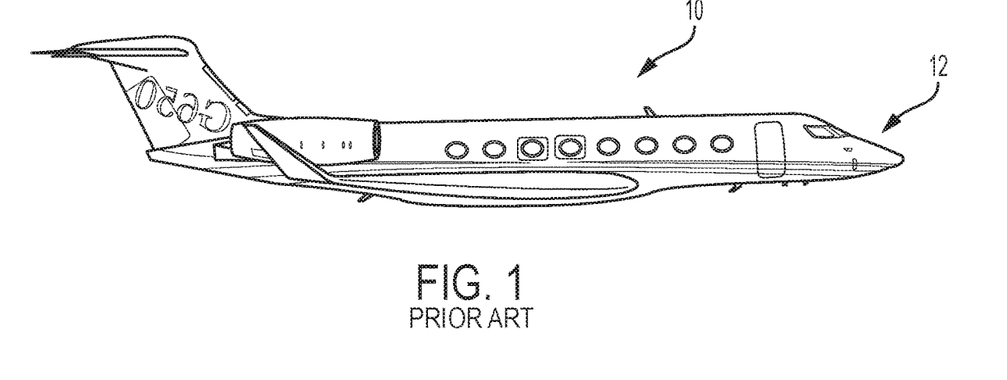
FIG. 1 is an illustration of an aircraft with a conventional nose radome.

A radome is a structural, weatherproof enclosure that is typically used to protect radar antenna or other imaging systems from the environment. Typically, a radome is constructed of material that minimally attenuates the electromagnetic signal transmitted or received by the antenna protected by the radome. With respect to aircraft, radar antennas are typically mounted inside a radome for protection. Depending upon the type and location of the radar antenna, the radome can be shaped and positioned as the nose of the aircraft, a portion of the wing or fuselage, or the tail of the aircraft. FIG. 1 illustrates an aircraft 10 having a nose radome 12 mounted to a bulkhead of the aircraft 10.

Radomes for aircraft are required to have sufficient strength to bear imposed aerodynamic loadings, and to be resistant to externally induced physical damage such as bird strikes, hail, and the like. In addition, radomes typically have a smooth outer surface to minimize aerodynamic resistance. There are many different types of materials used in constructing aircraft radomes and many different cross sectional configurations including single layer (typically made of a composite material), A-sandwich, B-sandwich, C-sandwich, and multiple-layer sandwich constructions. Exemplary materials include fiberglass, polytetrafluoroethylene (PTFE) coated fabrics, and polyurethane foams.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a radome has a curved body configured to be attached to an aircraft. In some embodiments, the radome is an aircraft nose radome and the body is an ogive-shaped body. The body has a first portion that is transparent to X band microwave energy (i.e., microwave energy in a frequency range from about 8.0 GHz to about 12.6 GHz), and a second portion that is transparent to W band microwave energy (i.e., microwave energy in a frequency range from about 75 GHz to about 100 GHz).

The second portion may be an insert that is secured to the body at an opening formed in the body. The insert has a configuration that substantially conforms to a shape of the body where the insert is located. In some embodiments, the insert has a multi-layer structure (e.g., a C-sandwich structure, etc.) comprising first, second and third solid material layers, a fourth layer of foam between the first and second layers, and a fifth layer of foam between the second and third layers. An exemplary material for the first, second and third layers is cyanate ester (CE) resin on an quartz substrate (e.g., fabric). An exemplary material for the fourth and fifth layers is polyurethane foam.

In some embodiments, the first layer has a thickness of about 0.03 inch, the second and third layers each have a thickness of about 0.04 inch, and the fourth and fifth layers each have a thickness of about 0.048 inch.

In some embodiments, the insert includes a plurality of spaced-apart, elongated reinforcing members or ribs between the first and second layers and between the second and third layers that extend along a longitudinal direction defined by the insert. In some embodiments, adjacent ones of the plurality of elongated reinforcing members are spaced-apart by about 1.0 inch.

In some embodiments, the insert has a sawtooth or serrated cross-sectional configuration.

According to other embodiments of the present invention, a radome has a curved body that is configured to be attached to an aircraft. An insert is secured to the body at an opening formed in the body. The insert has a configuration that substantially conforms to a curved shape of the body, and the insert also includes a sawtooth or serrated cross-sectional configuration. The body is transparent to microwave energy in a frequency range from about 8.0 GHz to about 12.6 GHz, and the insert is transparent to microwave energy in a frequency range from about 75 GHz to about 100 GHz. In some embodiments, the radome is an aircraft nose radome and the body is an ogive-shaped body.

In some embodiments, the insert has a multi-layer structure (e.g., a C-sandwich structure, etc.) comprising first, second and third solid material layers, a fourth layer of foam between the first and second layers, and a fifth layer of foam between the second and third layers. An exemplary material for the first, second and third layers is cyanate ester (CE) resin on an quartz substrate (e.g., fabric). An exemplary material for the fourth and fifth layers is polyurethane foam.

In some embodiments, the first layer has a thickness of about 0.03 inch, the second and third layers each have a thickness of about 0.04 inch, and the fourth and fifth layers each have a thickness of about 0.048 inch.

In some embodiments, the insert includes a plurality of spaced-apart, elongated reinforcing members or ribs between the first and second layers and between the second and third layers that extend along a longitudinal direction defined by the insert. In some embodiments, adjacent ones of the plurality of elongated reinforcing members are spaced-apart by about 1.0 inch.

According to some embodiments of the present invention, a radome has a body configured to be attached to an aircraft. The body has a first portion that is transparent to X band microwave energy (i.e., microwave energy in a frequency range from about 8.0 GHz to about 12.6 GHz), and a second portion that is transparent to W band microwave energy (i.e., microwave energy in a frequency range from about 75 GHz to about 100 GHz). The second portion may be an insert that is secured to the body at an opening formed in the body.

The insert has a configuration that substantially conforms to a shape of the body where the insert is located. In some embodiments, the insert has a multi-layer structure (e.g., a C-sandwich structure, etc.) comprising first, second and third solid material layers, a fourth layer of foam between the first and second layers, and a fifth layer of foam between the second and third layers. An exemplary material for the first, second and third layers is cyanate ester (CE) resin on an quartz substrate (e.g., fabric). An exemplary material for the fourth and fifth layers is polyurethane foam.

In some embodiments, the first layer has a thickness of about 0.03 inch, the second and third layers each have a thickness of about 0.04 inch, and the fourth and fifth layers each have a thickness of about 0.048 inch.

In some embodiments, the insert includes a plurality of spaced-apart, elongated reinforcing members or ribs between the first and second layers and between the second and third layers that extend along a longitudinal direction defined by the insert. In some embodiments, adjacent ones of the plurality of elongated reinforcing members are spaced-apart by about 1.0 inch.

In some embodiments, the insert has a sawtooth or serrated cross-sectional configuration.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

It will be understood that although terms such as "first" and "second" are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

The term "about", as used herein with respect to a value or number, means that the value or number can vary by +/−twenty percent (20%).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Figure 2:
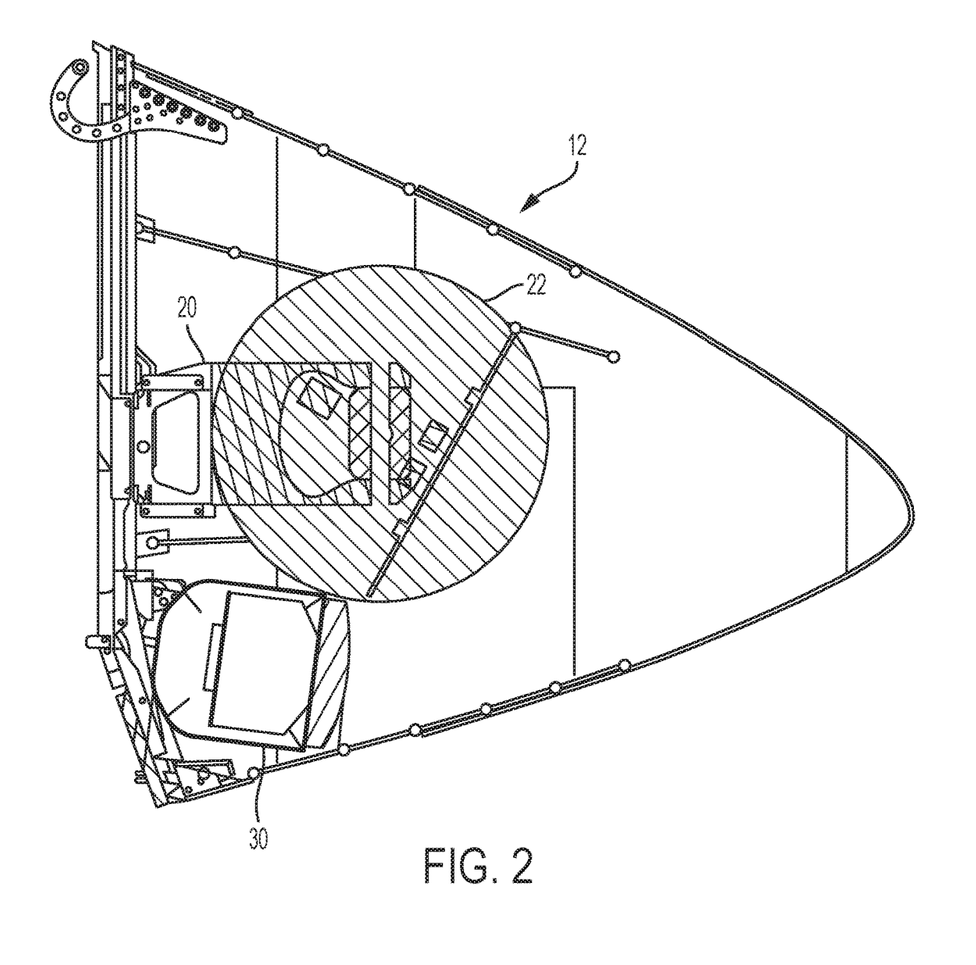
FIG. 2 is a cross-sectional view of a nose radome for an aircraft, according to some embodiments of the present invention, and that illustrates the location therewithin of a radar sensor and antenna, and a passive millimeter wave imaging device.

According to embodiments of the present invention, a novel radome design is provided that is configured to reduce transmission and reflection losses (e.g., <0.25 dB) at X-band frequencies and (<0.75 dB) at W-band over a 20 GHz bandwidth, and also provide a strong structure suitable for use with high speed aircraft. Referring initially to FIG. 2, a nose radome 12 for an aircraft is illustrated enclosing a radar imaging device 20 and antenna 22, and a passive millimeter wave imaging device 30. The radome 12 has a curved body 14 that is configured to be attached to an aircraft. Typically, the body 14 is an ogive-shaped body. The radome body 14 is constructed such that it is transparent to X band microwave energy (i.e., microwave energy in a frequency range from about 8.0 GHz to about 12.6 GHz) emitted by the radar imaging device 20. The radar imaging device 20 typically scans its antenna 22 to maintain a small incident angle relative to the radome surface.

Embodiments of the present invention are not limited to radomes located at the nose of an aircraft. Radomes in accordance with embodiments of the present invention can be positioned at various other locations without limitation, such as a wing, a fuselage, or tail of an aircraft, etc.

A portion of the radome body 14 is constructed such that it is transparent to W band microwave energy (i.e., microwave energy in a frequency range from about 75 GHz to about 100 GHz) emitted by the passive millimeter wave imaging device 30. In FIG. 2, the passive millimeter wave imaging device 30 is mounted below the radar imaging device 20 and has a fixed antenna. As such, the electromagnetic wave incident angles can not be changed by the passive millimeter wave imaging device 30. The W-band electromagnetic energy from the passive millimeter wave imaging device 30 contacts a lower portion of the radome 12 at very wide incident angles, as a result.

Figure 5:
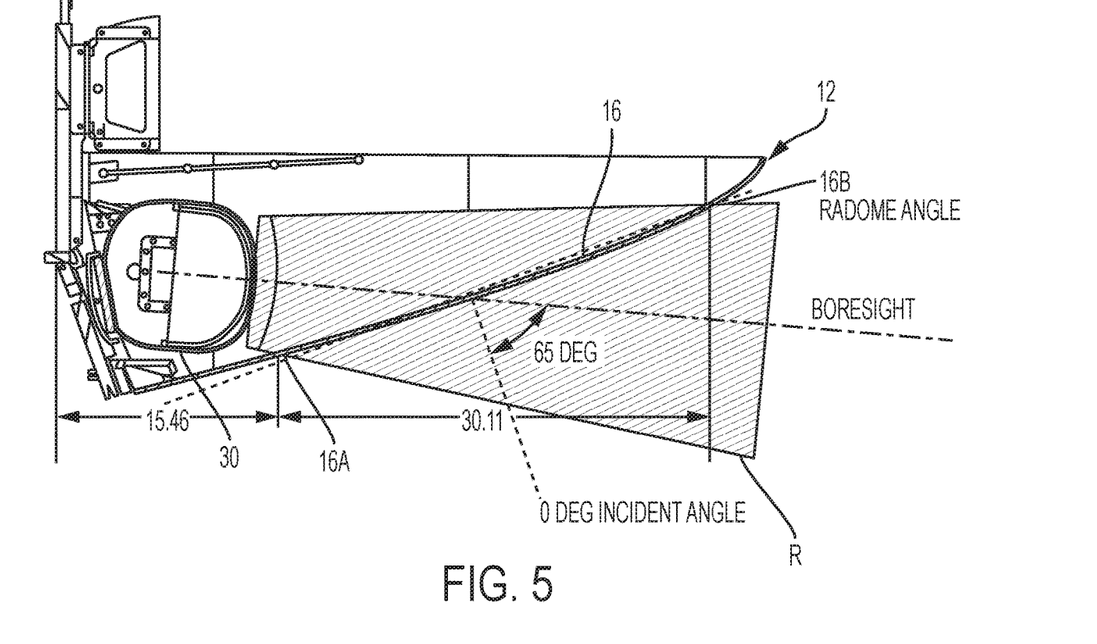
FIG. 5 is a partial side cross-sectional view of the radome of FIG. 2 illustrating the angle and direction of microwave energy emitted by a passive millimeter wave imaging device housed within the radome.

Because the passive millimeter wave imaging device 30 is positioned beneath the radar imaging device 20 and is angled downwardly (e.g., about five degrees (5°)), the bore sight of the passive millimeter wave imaging device 30 makes an angle relative to the radome 12 of approximately sixty five degrees (65°), as illustrated in FIG. 5. Microwave energy emitted from the passive millimeter wave imaging device 30 is illustrated by the shaded region R of FIG. 5. This emitted energy R defines an area 16 of the radome body 14 that is configured to be transparent to the W band microwave energy emitted by the passive millimeter wave imaging device 30. This area 16 has a left most portion 16A and a right most portion 16B, as shown in FIG. 5.

Figure 3A:
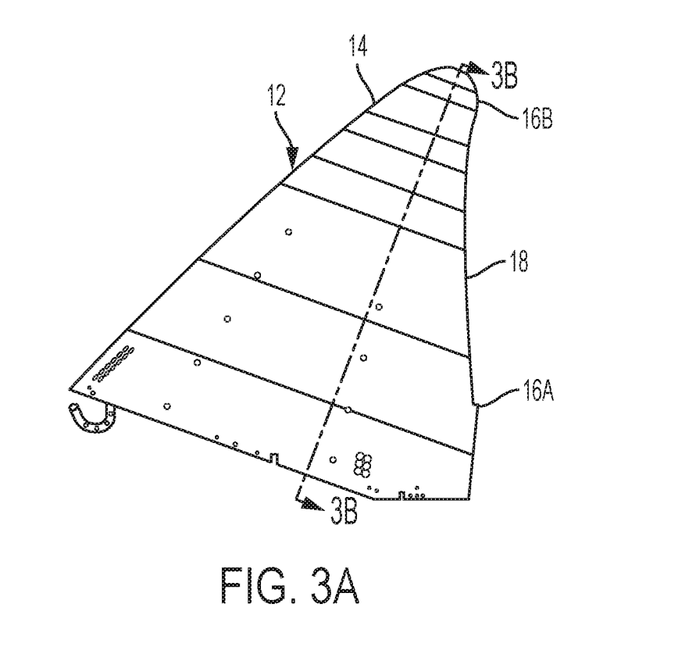
FIG. 3A is a side view of the radome of FIG. 2 with an opening formed therein for an insert according to some embodiments of the present invention.
Figure 3B:
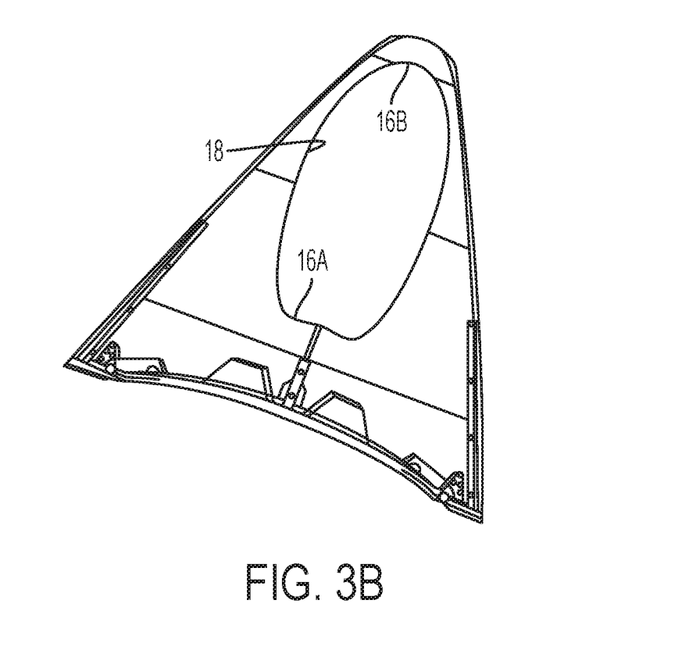
FIG. 3B is a cross-sectional view of the radome of FIG. 3A taken along line 3B-3B and illustrating the opening formed therein.
Figure 3C:
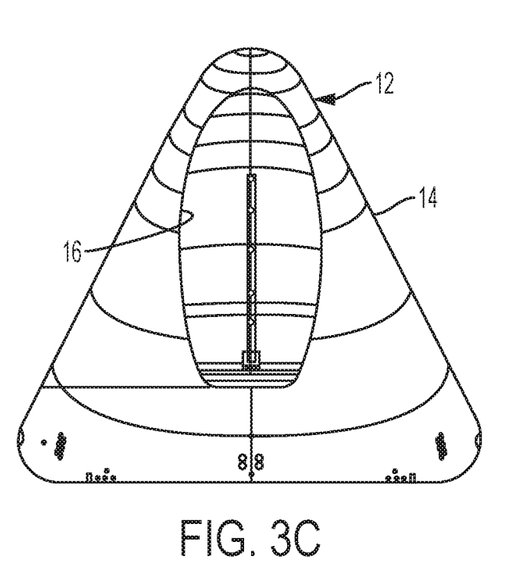
FIG. 3C is a bottom, plan view of the radome of FIG. 3A illustrating the opening formed therein.

In some embodiments, the radome body 14 has a unitary structure with an area 16 that is transparent to W band microwave energy emitted by the passive millimeter wave imaging device 30, and the remainder of the radome body 14 transparent to X band microwave energy emitted by the radar imaging device 20. In other embodiments, the radome body 14 is constructed with an opening 18 (FIGS. 3A-3C) configured to receive an insert 40 (FIGS. 4, 6, 7) that is transparent to the W band microwave energy emitted by the passive millimeter wave imaging device 30. The area of the opening 16 is selected to be the area through which W band microwave energy can be emitted by the passive millimeter wave imaging device 30, as a result of the location and position of the passive millimeter wave imaging device 30 within the radome 12.

Figure 4:
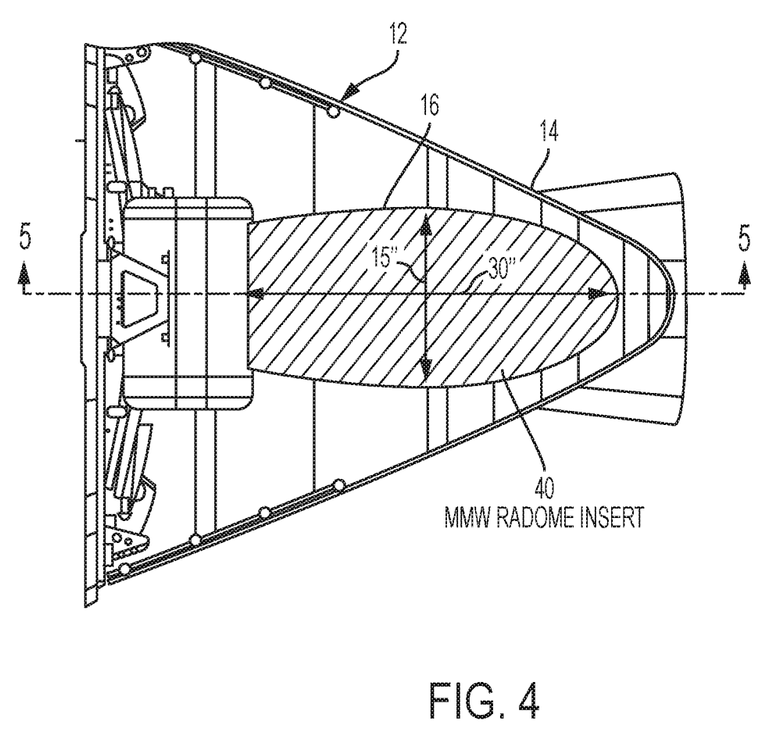
FIG. 4 is a bottom, plan view of the radome of FIG. 3A illustrating an insert secured to the radome at the opening of FIGS. 3A-3C, according to some embodiments of the present invention.

In an exemplary embodiment illustrated in FIG. 4, the opening 16 is configured to receive an insert 40 having a generally elliptical shape with a width of about fifteen inches (15") and a length of about thirty inches (30"). However, embodiments of the present invention are not limited to a particular shape or size of insert 40 that can be secured to a radome 12. Inserts having various shapes and sizes may be utilized in accordance with embodiments of the present invention.

Figure 6:
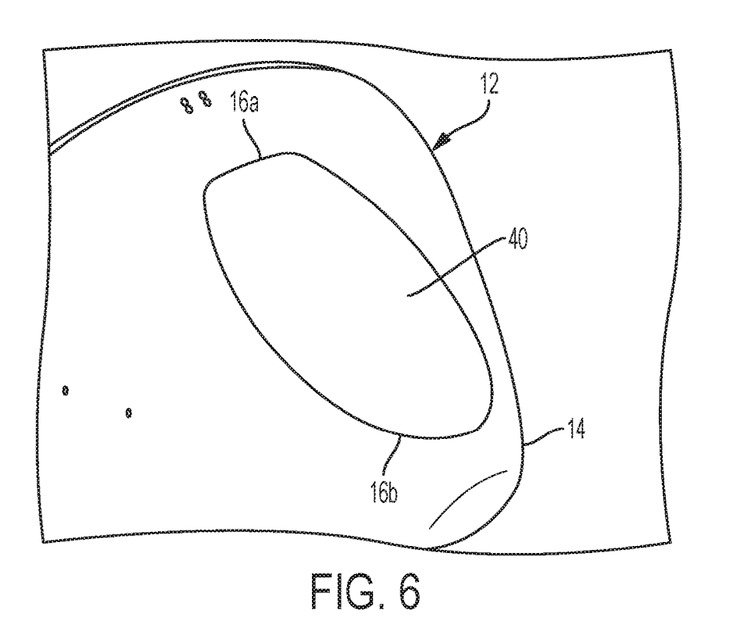
FIG. 6 is a bottom perspective view of the radome of FIG. 3A illustrating the insert of FIG. 4 secured within the opening thereof.
Figure 7:
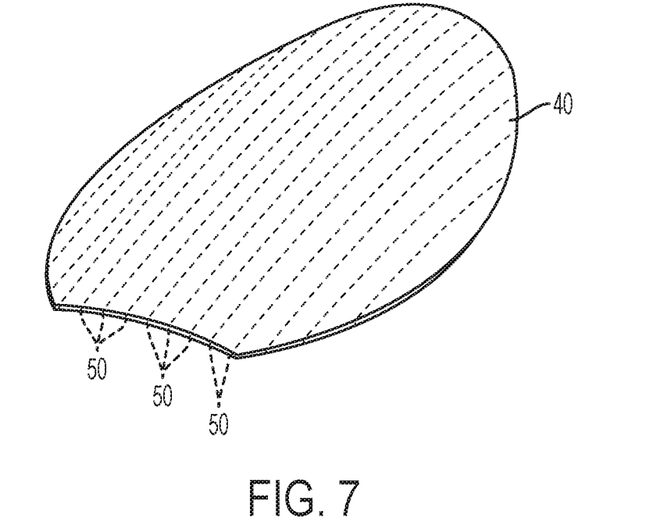
FIG. 7 is a perspective view of the insert of FIG. 4.

As shown in FIGS. 6 and 7, the illustrated insert 40 has a curved configuration that substantially conforms to the curved shape of the radome body 14 where the insert 40 is located. The radome 12 may be fabricated with the insert 40 for example by extending the upper and lower layers (i.e., first and third layers 42a, 42c) of the insert 40 over the edge of the radome cutout (i.e., opening 18, FIG. 3B) or by using epoxy film or prepreg cyanate ester quartz fabric around the edge of the cutout and curing it at the appropriate temperature under vacuum conditions. Techniques that are commonly used for patching radomes (for repairing damage) can also be used for attaching the radome insert 40 to a radome 12.

Figure 8A:
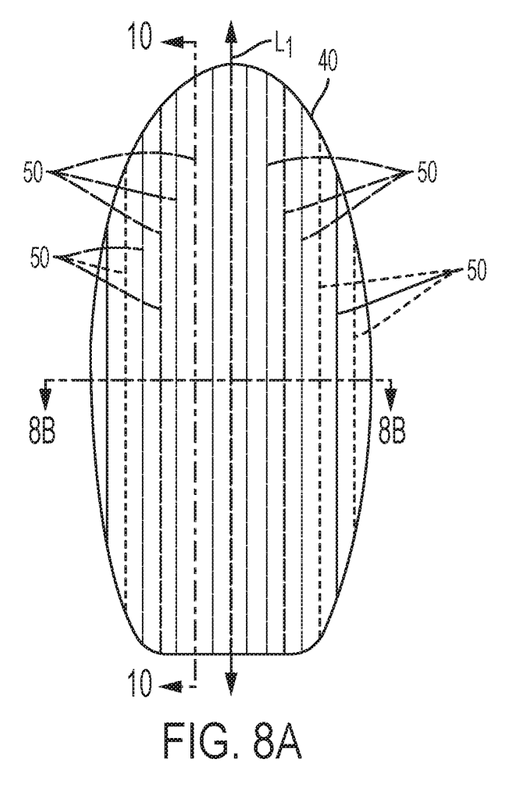
FIG. 8A is a plan view of the insert of FIG. 7.
Figure 8B:
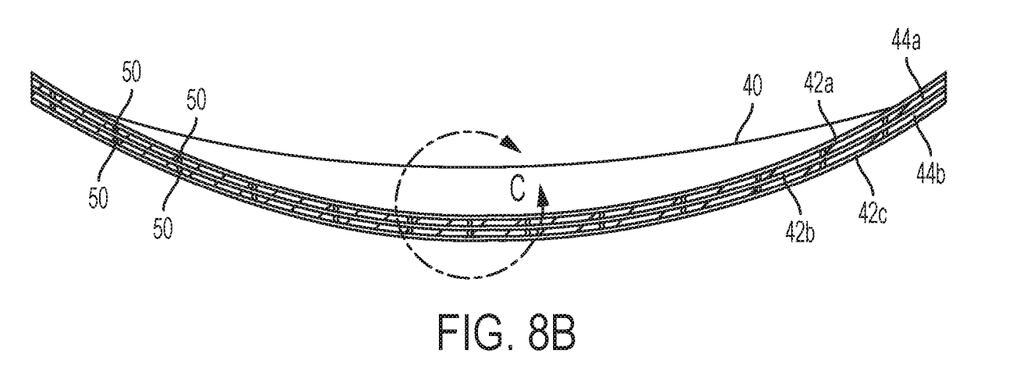
FIG. 8B is a cross-sectional view of the insert of FIG. 8A taken along line 8B-8B.
Figure 8C:
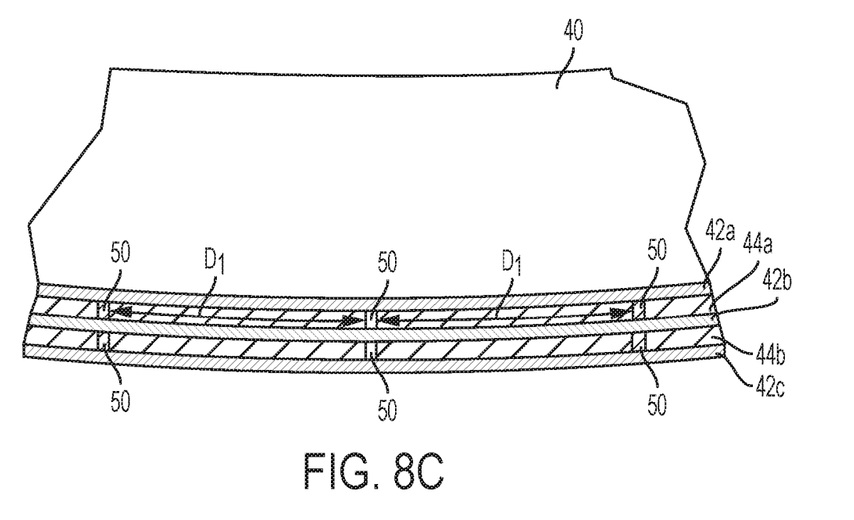
FIG. 8C is an enlarged partial view of a portion of the insert illustrated in FIG. 8B.

In some embodiments, the insert 40 has a multi-layer structure (e.g., a C-sandwich structure, etc.) comprising first, second and third layers 42a, 42b, 42c of solid laminate, as illustrated in FIGS. 8B and 8C. A fourth layer of foam 44a is positioned between the first and second layers 42a, 42b, and a fifth layer of foam 44b is positioned between the second and third layers 42b, 42c. In some embodiments, the first, second and third solid laminate layers 42a, 42b, 42c are formed from cyanate ester (CE) resin on a quartz fabric. However, other materials and configurations are possible for the first, second and third layers 42a, 42b, 42c. In some embodiments, the fourth and fifth layers 44a, 44b are foam, such as a polyurethane foam. However, other types of foam, as well as other materials may be utilized for the fourth and fifth layers 44a, 44b. For example, in some embodiments, the fourth and fifth layers 44a, 44b can be a honeycomb material, such as quartz honeycomb.

An outer protective layer 45 (FIG. 9), such as polyurethane or fluroelastomer paint, is typically applied to the outer layer (i.e., the third layer 42c) of the insert 40 to provide protection from rain and moisture. The protective layer 45 also provides resistance to static build up, protects from heat flash, and can improve performance, particularly in adverse aerodynamic heating situations.

In some embodiments, the first layer 42a has a thickness of about 0.03 inch, the second and third layers 42b, 42c each have a thickness of about 0.04 inch, and the fourth and fifth layers 44a, 44b each have a thickness of about 0.048 inch. However, other thicknesses are possible.

The illustrated insert 40 includes a plurality of spaced-apart, elongated reinforcing members or ribs 50 (FIGS. 8B-8C) positioned between the first and second layers 42a, 42b and positioned between the second and third layers 42b, 42c that extend along a longitudinal direction $L_1$ defined by the insert. In some embodiments, the elongated ribs 50 are formed from cyanate ester (CE) resin on a quartz substrate (e.g., fabric). However, other materials and configurations are possible. In some embodiments, a distance D1 between adjacent ones of the plurality of elongated reinforcing members 50 is about 1.0 inch. However, the reinforcing members 50 may be spaced-apart by other distances, greater or smaller, without limitation.

Applicant has discovered that the five layer design of the insert 40 of the present invention can obtain broadband (over 20%) capability at both low (<10 GHz) and high (80 to 100 GHz) frequency bands. Applicant has found that a structure with three layers has higher power transmission efficiency at certain frequency bands, but the bandwidth is narrow (<5%), and that a structure with seven layers has broader bandwidth at low frequency band, but the bandwidth at a high frequency band is insufficiently wide (5%).

Figure 9:
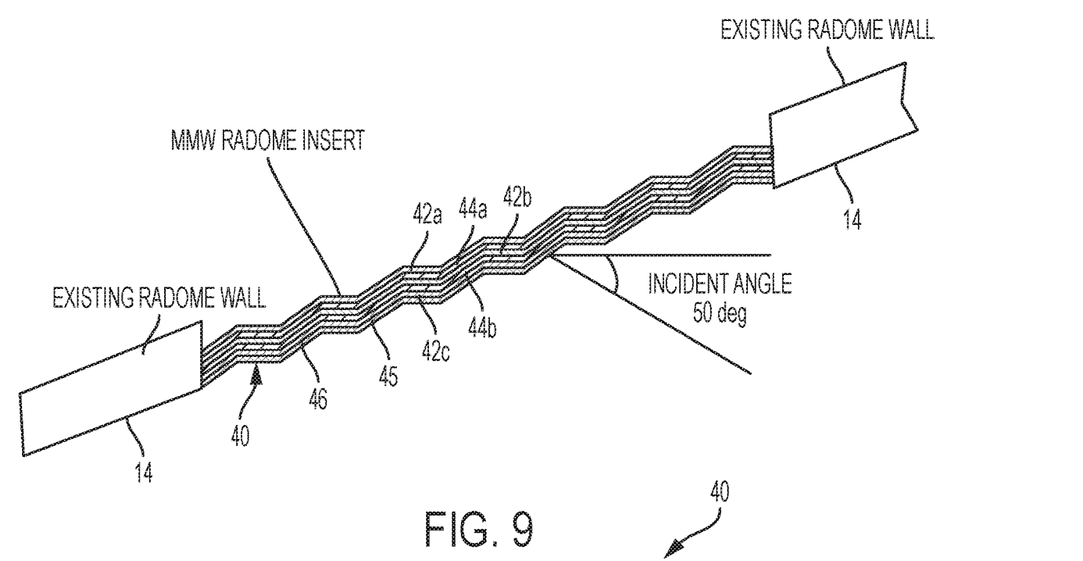
FIG. 9 is an exaggerated side view of the insert of FIG. 4 illustrating the serrated configuration of the insert, according to some embodiments of the present invention.
Figure 10:
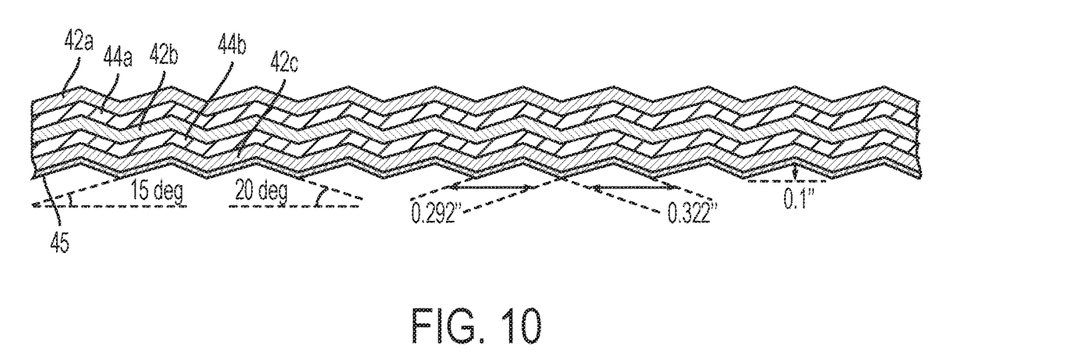
FIG. 10 is an exaggerated side view of the insert of FIG. 4 taken along line 10-10 in FIG. 8A.

Referring to FIGS. 9 and 10, in some embodiments, during fabrication, the insert 40 is formed such it has a sawtooth or serrated cross-sectional configuration (e.g., via vacuum molding, etc.). It is noted, however, that the serrated configuration of the insert 40 in FIGS. 9 and 10 is greatly exaggerated for clarity. The depth of any serration in the surface 46 of the insert is typically less than a tenth of an inch (0.1") in order to reduce negative aerodynamic effects on the radome insert 40 when in use. This serrated configuration reduces the incidence angle of the passive millimeter wave imaging device 30, thereby reducing the path length through the material of the insert 40. The serrated configuration can be considered a series of narrow windows staggered so as to form the overall desired angle of the window relative to the primary axis of the passive millimeter wave imaging device 30. The surface of each of these narrow windows presents a lower incidence angle to the passive millimeter wave imaging device 30 line of sight. As illustrated in FIG. 10, the serrated configuration can reduce the incident angle by up to about twenty degrees (20°), thereby reducing transmission and reflection losses of the insert 40.

Figure 11A:
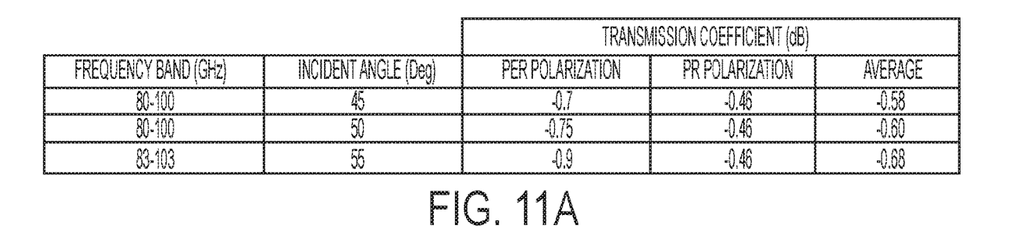
FIGS. 11A-11C are tables summarizing W band microwave energy transmission loss through the insert of FIG. 4, according to some embodiments of the present invention.
Figure 11B:
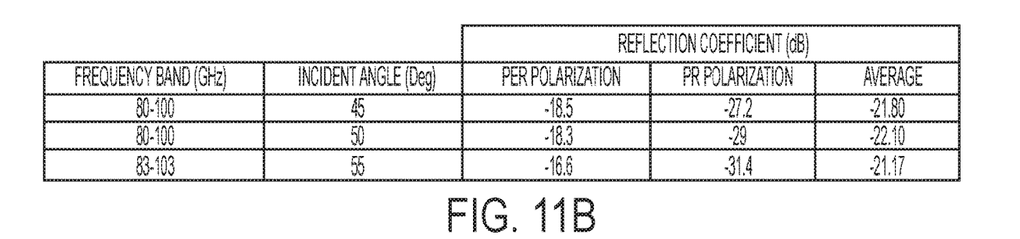
Figure 11C:
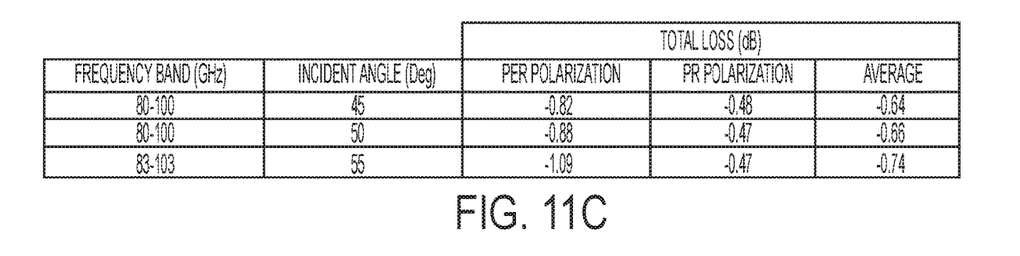

FIGS. 11A-11C illustrate losses for the radome insert 40 described above. Losses at W-band frequencies over a 20 GHz bandwidth are below 0.75 dB, and losses at X-band are below 0.25 dB.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A radome, comprising:
   a curved body configured to be attached to an aircraft;
   wherein the curved body is transparent to X band microwave energy, and comprises an opening formed through a wall thereof; and
   wherein an insert is positioned within the opening and is transparent to W band microwave energy, wherein the insert has a serrated cross-sectional configuration such that an outer surface of the insert comprises a series of windows, and wherein respective surfaces of adjacent windows are angled relative to each other.

2. The radome of claim 1, wherein the X band microwave energy has a frequency range from about 8.0 GHz to about 12.6 GHz, and wherein the W band microwave energy has a frequency range from about 75 GHz to about 100 GHz.

3. The radome of claim 1, wherein the insert has a configuration that substantially conforms to a curved shape of the body.

4. The radome of claim 3, wherein the insert has a multi-layer structure comprising first, second and third solid laminate layers, a fourth layer of foam between the first and second layers, and a fifth layer of foam between the second and third layers.

5. The radome of claim 4, wherein the first, second and third solid laminate layers each comprise cyanate ester (CE) resin on a quartz substrate, and wherein the fourth and fifth layers comprise polyurethane foam.

6. The radome of claim 4, wherein the first layer has a thickness of about 0.03 inch, wherein the second and third layers each have a thickness of about 0.04 inch, and wherein the fourth and fifth layers each have a thickness of about 0.048 inch.

7. The radome of claim 4, wherein the multi-layer structure is a C-sandwich structure.

8. The radome of claim 4, wherein the insert further comprises a plurality of spaced-apart, elongated reinforcing members between the first and second layers and between the second and third layers.

9. The radome of claim 8, wherein the plurality of elongated reinforcing members extend along a longitudinal direction defined by the insert.

10. The radome of claim 8, wherein adjacent ones of the plurality of elongated reinforcing members are spaced-apart by about 1.0 inch.

11. The radome of claim 1, wherein the curved body is an ogive-shaped body.

12. The radome of claim 1, wherein the radome is an aircraft nose radome.

13. A radome, comprising:
   a curved body configured to be attached to an aircraft, wherein the body is transparent to microwave energy in a frequency range from about 8.0 GHz to about 12.6 GHz, wherein the body comprises an opening formed through a wall thereof; and
   an insert positioned within the opening, wherein the insert is transparent to microwave energy in a frequency range from about 75 GHz to about 100 GHz, wherein the insert has a configuration that substantially conforms to a curved shape of the body, and wherein the insert has a serrated cross-sectional configuration such that an outer surface of the insert comprises a series of windows, and wherein respective surfaces of adjacent windows are angled relative to each other.

14. The radome of claim 13, wherein the insert has a multi-layer structure comprising first, second and third solid laminate layers, a fourth layer of foam between the first and second layers, and a fifth layer of foam between the second and third layers.

15. The radome of claim 14, wherein the first layer has a thickness of about 0.03 inch, wherein the second and third layers each have a thickness of about 0.04 inch, and wherein the fourth and fifth layers each have a thickness of about 0.048 inch.

16. The radome of claim 14, wherein the multi-layer structure is a C-sandwich structure.

17. The radome of claim 14, wherein the insert further comprises a plurality of spaced-apart, elongated reinforcing members between the first and second layers and between the second and third layers, and wherein the plurality of elongated reinforcing members extend along the longitudinal direction.

18. The radome of claim 13, wherein the first, second and third solid laminate layers each comprise cyanate ester (CE) resin on a quartz substrate, and wherein the fourth and fifth layers comprise polyurethane foam.

19. The radome of claim 13, wherein adjacent ones of the plurality of elongated reinforcing members are spaced-apart by about 1.0 inch.

20. The radome of claim 13, wherein the curved body is an ogive-shaped body.

21. The radome of claim 13, wherein the radome is an aircraft nose radome.

22. A radome, comprising:
a body configured to be attached to an aircraft, wherein the body is transparent to X band microwave energy, and wherein the body comprises an opening formed through a wall thereof; and
an insert positioned within the opening, wherein the insert is transparent to W band microwave energy, wherein the insert has a serrated cross-sectional configuration such that an outer surface of the insert comprises a series of windows, and wherein respective surfaces of adjacent windows are angled relative to each other.

23. The radome of claim 22, wherein the X band microwave energy has a frequency range from about 8.0 GHz to about 12.6 GHz, and wherein the W band microwave energy has a frequency range from about 75 GHz to about 100 GHz.

24. The radome of claim 22, wherein the insert has a configuration that substantially conforms to a shape of the body.

25. The radome of claim 24, wherein the insert has a multi-layer structure comprising first, second and third solid laminate layers, a fourth layer of foam between the first and second layers, and a fifth layer of foam between the second and third layers.

26. The radome of claim 25, wherein the first, second and third solid laminate layers each comprise cyanate ester (CE) resin on a quartz substrate, and wherein the fourth and fifth layers comprise polyurethane foam.

27. The radome of claim 25, wherein the first layer has a thickness of about 0.03 inch, wherein the second and third layers each have a thickness of about 0.04 inch, and wherein the fourth and fifth layers each have a thickness of about 0.048 inch.

28. The radome of claim 25, wherein the multi-layer structure is a C-sandwich structure.

29. The radome of claim 25, wherein the insert further comprises a plurality of spaced-apart, elongated reinforcing members between the first and second layers and between the second and third layers.

30. The radome of claim 29, wherein the plurality of elongated reinforcing members extend along a longitudinal direction defined by the insert.

31. The radome of claim 29, wherein adjacent ones of the plurality of elongated reinforcing members are spaced-apart by about 1.0 inch.

* * * * *